(12) United States Patent
Couwenhoven et al.

(10) Patent No.: US 7,245,395 B2
(45) Date of Patent: Jul. 17, 2007

(54) CALIBRATING A DIGITAL PRINTER USING A COST FUNCTION

(75) Inventors: Douglas W. Couwenhoven, Fairport, NY (US); Gustav Braun, Fariport, NY (US); Kevin E. Spaulding, Spencerport, NY (US); Geoffrey J. Woolfe, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 1072 days.

(21) Appl. No.: 10/309,866

(22) Filed: Dec. 4, 2002

(65) Prior Publication Data

US 2004/0109178 A1 Jun. 10, 2004

(51) Int. Cl.
*H04N 1/58* (2006.01)
*H04N 1/60* (2006.01)
*G06K 9/00* (2006.01)

(52) U.S. Cl. .................. 358/1.9; 358/504; 358/518; 358/3.26; 382/162; 382/167

(58) Field of Classification Search ............... 358/1.9, 358/518, 504, 522–525, 538, 502, 3.26; 345/603–604; 348/652; 347/15, 43; 382/162, 167
See application file for complete search history.

(56) References Cited

U.S. PATENT DOCUMENTS

| | | | |
|---|---|---|---|
| 4,482,917 A | 11/1984 | Gaulke et al. | |
| 4,930,018 A | 5/1990 | Chan et al. | |
| 5,012,257 A | 4/1991 | Lowe et al. | |
| 5,425,134 A | 6/1995 | Ishida | |
| 5,508,827 A | 4/1996 | Po-Chieh | |
| 5,515,479 A | 5/1996 | Klassen | |
| 5,553,199 A | 9/1996 | Spaulding et al. | |
| 5,563,985 A | 10/1996 | Klassen et al. | |
| 5,583,666 A * | 12/1996 | Ellson et al. | ............... 358/518 |
| 5,633,662 A | 5/1997 | Allen et al. | |
| 5,710,824 A | 1/1998 | Mongeon | |
| 5,822,451 A | 10/1998 | Spaulding et al. | |
| 6,081,340 A | 6/2000 | Klassen | |
| 6,312,101 B1 * | 11/2001 | Couwenhoven et al. | ..... 358/521 |
| 2003/0202043 A1 * | 10/2003 | Zeng et al. | ................... 347/43 |
| 2005/0128495 A1 * | 6/2005 | Arai | ........................... 358/1.9 |

OTHER PUBLICATIONS

Specification ICC.1:2001-12 "File Format For Color Profiles".

* cited by examiner

*Primary Examiner*—Kimberly Williams
*Assistant Examiner*—Charlotte M. Baker
(74) *Attorney, Agent, or Firm*—Raymond L. Owens

(57) ABSTRACT

A method of selecting a preferred colorant control signal vector for a color output device for reproducing a desired output color, the color output device producing output colors using four or more colorants, wherein the amount of each colorant is controlled by the colorant control signal vector, includes determining a device model for the color output device relating the colorant control signal vector to the corresponding output color; using the device model to determine a set of valid colorant control signal vectors whose corresponding output color substantially matches the desired output color; and selecting the preferred colorant control signal vector from the set of valid colorant control signal vectors using a cost function responsive to one or more cost attribute(s) that vary as a function of the colorant control signal vector.

19 Claims, 5 Drawing Sheets

CALIBRATING A DIGITAL PRINTER USING A COST FUNCTION

CROSS REFERENCE TO RELATED APPLICATIONS

Reference is made to commonly assigned U.S. patent application Ser. No. 09/881,460 filed Jun. 14, 2001 by Douglas Couwenhoven et al., entitled "Method for Multilevel Printing of Digital Images Using Reduced Colorant Amounts", and commonly assigned U.S. patent application Ser. No. 10/310,009 filed concurrently herewith by Gustav Braun et al., entitled "Color Gamut Mapping Using a Cost Function", the disclosures of which are herein incorporated by reference.

FIELD OF THE INVENTION

This invention pertains to digital imaging, and more particularly to a color transformation used in preparing a digital image for printing.

BACKGROUND OF THE INVENTION

A typical digital imaging system may include an image capture device such as a digital camera or scanner, a computer attached to the digital camera for processing the digital images, and an output device such as a printer or softcopy display attached to the computer for printing/viewing the processed digital images. A color management architecture for a digital imaging system provides a means for processing the digital images in the computer such that the output colors that are produced on the output device are reasonable reproductions of the desired input colors as captured by the input device. One such color management architecture that is widely known and accepted in the art is defined by the International Color Consortium (ICC) in Specification ICC. 1:2001-12 "File Format For Color Profiles". The ICC color management framework provides for characterizing an imaging device using a device profile such as an "ICC profile". The ICC profile for an imaging device specifies how to convert from device dependent color space (DDCS) to a device independent color space (DICS) so that images may be communicated from one device to another.

For example, images generated by a digital camera are generally composed of a 2-dimensional (x,y) array of discrete pixels, where each pixel is represented by a trio of 8-bit digital code values (which are integers on the range 0-255) that represent the amount of red, green, and blue color that were "seen" by the camera at this pixel. These RGB code values represent the DDCS, since they describe the amount of light that was captured through the specific set of RGB filters that are used in the digital camera. In order for this digital image to be used, the RGB code values must be transformed into a DICS so they may be properly interpreted by another imaging device. An example of a typical digital imaging system incorporating ICC color management is depicted in FIG. 1, in which a digital image source 10 provides RGB input code values (a DDCS) to a computer (not shown). The computer transforms the RGB input code values to a DICS, (which is CIELab in this case) using an input device color transform 20 specified by the ICC profile for the digital image source 10. Once converted to CIELab, the image is then processed through an output device color transform 30, which is specified by an ICC profile for the output device. In this case, the output device is an inkjet printer 40 that uses cyan (C), magenta (M), yellow (Y), and black (K) colorants. Thus, the ICC profile for the inkjet printer 40 provides the transformation from the DICS (CIELab) to the DDCS (CMYK) for the printer. The combination of the ICC profile transformations for the input and output devices ensures that the colors reproduced by the output device match those captured by the input device.

The ICC profile format, of course, simply provides a file format in which a color transform is stored. The color transform itself, which is typically encoded as a multidimensional look-up table, is what specifies the mathematical conversion from one colorspace to another. There are many tools known in the art (such as the commercially available Kodak ColorFlow Profile Editor) for creating ICC profiles for wide variety of imaging devices, including inkjet printers using CMYK colorants. CMYK printers in particular pose a challenge when creating a color transform. Since there are four colorants that are used to print a given color, which is specified in the DICS by three channels ($L^*,a^*,b^*$), then there is an extra degree of freedom that results in a many to one mapping, where many CMYK code value combinations can result in the same color. Thus, when building the color transform, a method of choosing a particular CMYK combination that is used to reproduce a given color is required. Techniques to accomplish this, known in the graphic arts as Under Color Removal (UCR) or Black Generation (BG), are known in the art, as taught in U.S. Pat. Nos. 4,482,917; 5,425,134; 5,508,827; 5,553,199; and 5,710,824. These methods primarily use smooth curves or interpolation techniques to specify the amount of K ink that is used to reproduce a color based on its location in colorspace, and then compute the amount of CMY ink that is needed to accurately reproduce the color.

However, in the case of an inkjet printer, which places discrete drops of CMYK inks on a page, different combinations of CMYK code values may produce the same color, but appear much different in graininess or noise when viewed by a human observer. This is due to the fact that inkjet printers are typically multitone printers, which are capable of ejecting only a fixed number (generally 1-8) of discrete ink drop sizes at each pixel. The graininess of a multitoned image region will vary depending on the CMYK code values that were used to generate it. Thus, certain CMYK code value combinations might produce visible patterns having an undesirable grainy appearance, while other CMYK code value combinations may produce the same (or nearly) color, but not appear as grainy. This relationship is not recognized nor taken advantage of in the prior art techniques for generating color transforms for CMYK printers.

An additional complication with creating color transform for inkjet printers is that image artifacts can typically result from using too much ink. These image artifacts degrade the image quality, and can result in an unacceptable print. In the case of an inkjet printer, some examples of these image artifacts include bleeding, cockling, banding, and coalescence. Bleeding is characterized by an undesirable mixing of colorants along a boundary between printed areas of different colorants. The mixing of the colorants results in poor edge sharpness, which degrades the image quality. Cockling is characterized by a warping or deformation of the receiver that can occur when printing excessive amounts of colorant. In severe cases, the receiver may warp to such an extent as to interfere with the mechanical motions of the printer, potentially causing damage to the printer. Banding refers to unexpected dark or light lines or streaks that appear running across the print, generally oriented along one of the axes of motion of the printer. Coalescence refers to undesired density or tonal variations that arise when ink pools together on the page, and can give the print a grainy appearance, thus degrading the image quality. In an inkjet printer, satisfactory density and color reproduction can generally be achieved without using the maximum possible amount of colorant. Therefore, using excessive colorant not only introduces the possibility of the above described image artifacts occurring, but is also a waste of colorant. This is disadvantageous, since the user will get fewer prints from a given quantity of colorant.

It has been recognized in the art that the use of excessive colorant when printing a digital image needs to be avoided. Generally, the amount of colorant needed to cause image artifacts (and therefore be considered excessive) is receiver, colorant, and printer technology dependent. Many techniques of reducing the colorant amount are known in the art, some of which operate on the image data after multitoning. See for example U.S. Pat. Nos. 4,930,018; 5,515,479; 5,563,985; 5,012,257; and 6,081,340. U.S. Pat. No. 5,633,662 to Allen et al. teaches a method of reducing colorant using a pre-multitoning algorithm that operates on higher bit precision data (typically 256 levels, or 8 bits per pixel, per color). Also, many of the commercially available ICC profile creation tools (such as Kodak ColorFlow Profile Editor) have controls that can be adjusted when creating the ICC profile that limit the amount of colorant that will be printed when using the ICC profile. This process is sometimes referred to as total colorant amount limiting.

The prior art techniques for total colorant amount limiting work well for many inkjet printers, but are disadvantaged when applied to state of the art inkjet printers that use other than the standard set of CMYK inks. A common trend in state of the art inkjet printing is to use CMYKcm inks, in which additional cyan and magenta inks that are lighter in density are used. The light inks are similar to their darker counterparts in that they produce substantially the same color but different density. The use of the light inks results in less visible ink dots in highlight regions, and therefore improved image quality. However, many tools for creating ICC profiles cannot be used to create a profile that directly addresses all six color channels of the inkjet printer, due to the complex mathematics involved. Instead, a CMYK profile is typically created, which is then followed by a look-up table that converts CMYK to CMYKcm. For example, see U.S. Pat. No. 6,312,101. While this and similar methods provide a way for current ICC profile generation tools to be used with CMYKcm printers, the amount of colorant that gets placed on the page as a function of the CMYK code value is typically highly nonlinear and possibly non-monotonic as well. This creates a big problem for the prior art ICC profile generation tools, since they all assume that the amount of colorant that is printed is proportional to the CMYK code value. Thus, when building an ICC profile for a CMYKcm printer using prior art tools, the total colorant amount limiting is often quite inaccurate, resulting in poor image quality.

In light of the above described image artifacts, there is the need for a color transformation used in preparing a digital image for a digital printer in which the amount of colorant, the noise (or graininess), and the color reproduction accuracy can be simultaneously adjusted by a user.

SUMMARY OF THE INVENTION

It is an object of the present invention to provide for printing high quality digital images that are free of the above described artifacts associated with using excessive amounts of colorant.

It is a further object of the present invention to reduce the amount of colorant used to print an image on a multilevel printer in which the colorant amount may not be linear or monotonic with digital code value, thereby resulting in improved image quality relative to the prior art.

Another object of the present invention is to provide for accurate total colorant amount limiting and accurate color calibration for a multilevel printer in which the colorant amount may not be linear or monotonic with digital code value.

Yet another object of the present invention is to provide for accurate color calibration while minimizing the appearance of undesirable graininess or noise.

These objects are achieved by a method of selecting a preferred colorant control signal vector for a color output device for reproducing a desired output color, the color output device producing output colors using four or more colorants, wherein the amount of each colorant is controlled by the colorant control signal vector, comprising the steps of:

a) determining a device model for the color output device relating the colorant control signal vector to the corresponding output color;

b) using the device model to determine a set of valid colorant control signal vectors whose corresponding output color substantially matches the desired output color; and c) selecting the preferred colorant control signal vector from the set of valid colorant control signal vectors using a cost function responsive to one or more cost attribute(s) that vary as a function of the colorant control signal vector.

Advantages

By using a cost function to create a color transformation used in preparing a digital image for a digital printer in accordance with the present invention, high quality digital images that are free of the above mentioned artifacts are provided. The present invention provides a way of creating a color transform that simultaneously provides accurate color calibration and total colorant amount limiting for a digital printer, while minimizing the appearance of undesirable graininess or noise. The present invention provides for a substantial improvement over the prior art in that it provides these benefits for multilevel printers in which the colorant amount may not be linear or monotonic with digital code value.

DETAILED DESCRIPTION OF THE INVENTION

Figure 1:
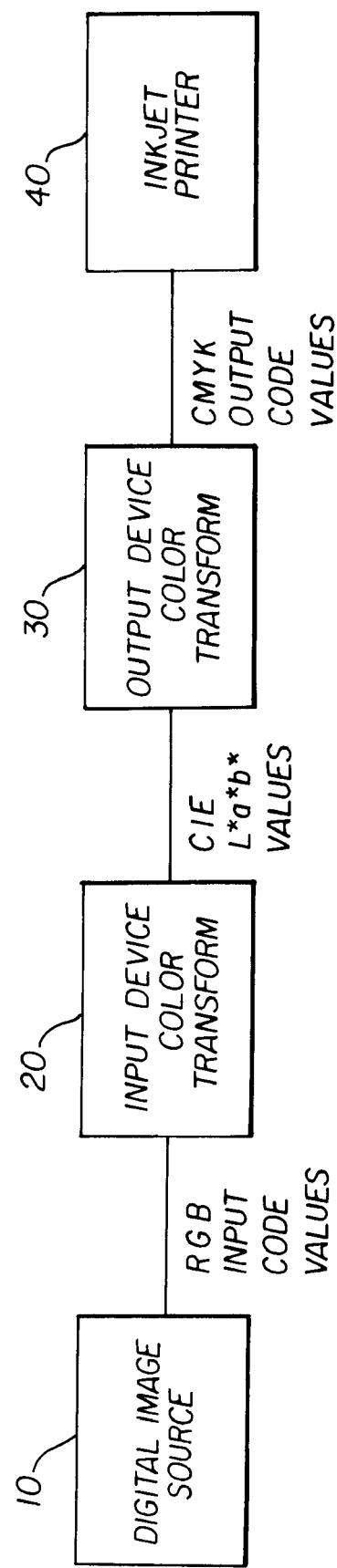
FIG. 1 is a block diagram showing a digital imaging system for practicing the present invention.

A method of generating a color transform that provides for accurate total colorant amount limiting, pleasing color reproduction, and control over graininess represents advancement in the state of the art. A preferred embodiment of the present invention achieving these goals will be described hereinbelow. The invention will be described in the context of a color inkjet printer using CMYK inks, but one skilled in the art will recognize that the scope of the invention is not limited to this arrangement, and may be applied to other colorant sets and/or other printing technologies as well.

In a CMYK inkjet printer, a desired output color can generally be reproduced by many combinations of CMYK code values. Each combination of CMYK code values is referred to as a colorant control signal vector, which causes the printer to eject specified amounts of each color ink on the page in accordance with the corresponding code value. Generally speaking, as understood by one skilled in the art, one unit of K ink will provide a similar contribution to the output color as one unit of C, M, and Y inks printed in conjunction. This relationship is not exact by any means, and varies depending on the particular spectral characteristics of the individual inks, but in general is useful in understanding how different CMYK code values can produce the same output color. For example, Table 1 shows several different CMYK code value combinations, and the associated output color (specified in CIELab coordinates). Also shown for each CMYK code value combination is the associated total colorant amount (ink volume in this case), and the image noise metric value of a color patch printed using the given CMYK code values. Details on the generation of the image noise metric value will be discussed further.

TABLE 1

| C | M | Y | K | L* | a* | b* | Vol | Noise |
|---|---|---|---|----|----|----|-----|-------|
| 13 | 0 | 0 | 160 | 42 | −5 | 0 | 27 | 6.3 |
| 90 | 86 | 81 | 57 | 42 | −5 | 0 | 69 | 2.7 |
| 170 | 161 | 153 | 0 | 42 | −5 | 0 | 82 | 2.1 |

Note from Table 1 that the CMYK code values shown produce the same output color, but have different ink volumes and image noise metric values. For example, the first row of the table corresponds to a patch printed using mostly K ink, which uses the least ink volume, but has the highest image noise metric value. Generally speaking, a high value for the image noise metric means that the region of the image corresponding to this output color will appear undesirably grainy to a human observer. Low values of the image noise metric correspond to patches that appear more pleasing and uniform. The bottom row of Table 1 corresponds to a patch of the same output color, but printed using no K ink. This patch uses the most ink volume, but results in the lowest image noise metric value. There will, in fact, be many other CMYK code values that will produce the same output color as those shown in Table 1. The present invention provides for a method of selecting an optimal CMYK code value combination from the many possibilities to produce superior image quality.

Figure 2:
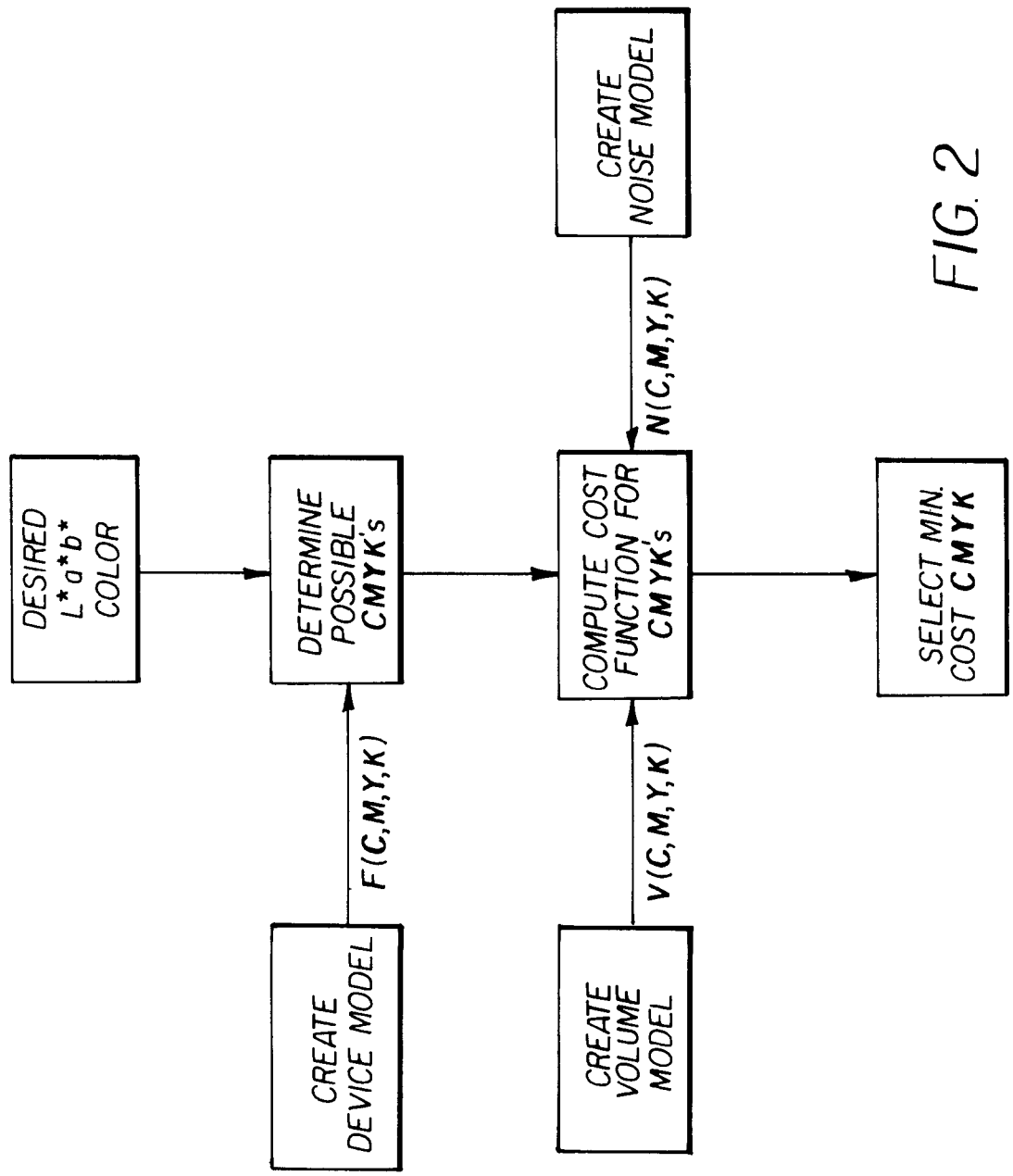
FIG. 2 is a flowchart showing the method of the present invention.

In some applications, it may be desirable to minimize image noise above all else, while in other applications, it may be desirable to use as little ink as possible, regardless of image noise. A different application may require that the K ink and the CMY inks are used in relatively equal proportion. It is likely that every application has a slightly different set of design criteria. The method of the present invention allows the user to satisfy any particular set of design criteria by employing a cost function based approach for selecting the preferred CMYK control signal vector for any desired output color. The process by which this is achieved, according to a preferred embodiment, is shown in FIG. 2. The first step in the process is to determine all possible CMYK code value combinations that will produce a desired output color. To do this, a device model F(C,M, Y,K) is created which predicts the CIELab values that describe the output color that is printed as a function of the C, M, Y, and K code values. There are many ways in which the device model F(C,M,Y,K) may be created that are known to those skilled in the art. One way is to use the known spectral characteristics of the inks with color mixing equations to predict the output color without actually printing it. In a preferred embodiment, an image target consisting of a number of color patches substantially covering the full CMYK code value range is actually printed, and the CIELab values for each color patch are measured. A multidimensional look-up table is then created from the CMYK code values and corresponding CIELab values using multidimensional linear interpolation between the sampled data points.

In order to determine the possible CMYK code value combinations that will produce a desired output color, the device model F(C,M,Y,K), which produces L*a*b* as a function of CMYK, must be inverted such that it produces CMYK as a function of L*a*b*. Due to the fact that F(C,M,Y,K) forms a many-to-one mapping (in that many CMYK's produce the same L*a*b*), direct inversion is not possible. However, there are techniques known in the art to provide for inversion of a CMYK device model. One such technique, used in a preferred embodiment of the present invention, is taught by Spaulding et al., in commonly assigned U.S. Pat. No. 5,553,199, the disclosure of which is incorporated herein by reference. Spaulding teaches a CMYK device model inversion in which a range of valid K values is defined by a minimum K value and a maximum K value for which it is possible to reproduce a given color. The CMY values corresponding to values of K on the valid range are then determined using tetrahedral interpolation on a 3-dimensional subspace defined by the K value. This technique provides an efficient method for determining all possible CMYK code value combinations that will produce a desired output color.

Figure 3:
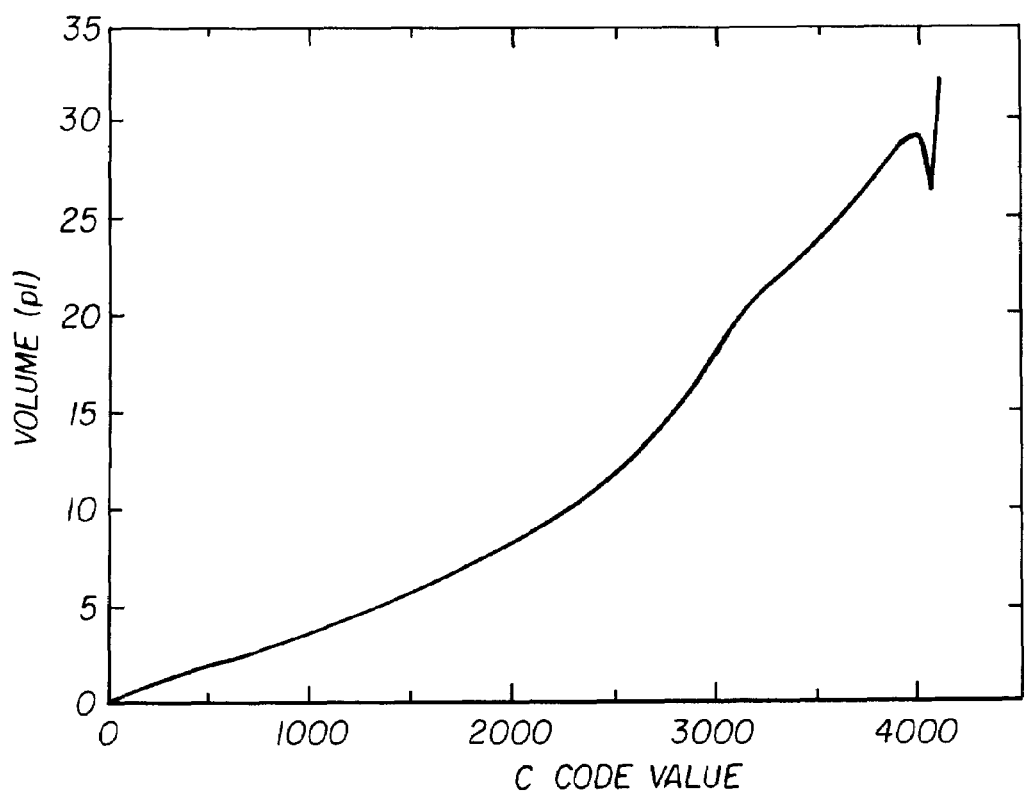
FIG. 3 is a graph showing ink volume as a function of code value.

Turning again to FIG. 2, the next step in the process of the present invention is to compute a cost value associated with each possible CMYK combination using a cost function. The cost function includes terms for many cost attributes, relating to many different design characteristics. For example, using too much colorant can result in undesirable artifacts, as described above. Thus, the cost function includes a term that penalizes CMYK code value combinations using higher amounts of ink volume. The ink volume is computed using a volume model, which predicts the ink volume as a function of the CMYK code values. For many printers, the volume model can be analytically expressed as an equation, given some knowledge about the specifications of the printer, such as the number of ink drop sizes that can be ejected at each pixel, and their associated volumes. For example, in the simple case of a binary CMYK printer with a fixed drop volume of 32 picoliters, the volume produced by a given CMYK code value combination will vary linearly with the sum of the CMYK code values. However, state of the art inkjet printers can have highly nonlinear and/or non-monotonic ink volume curves as a function of the CMYK code value. An example of such a curve is shown in FIG. 3, which was derived from the C data channel of a Kodak Professional 3062 Large Format Inkjet printer. The curve shown in FIG. 3 has a complex shape due to the fact that two cyan inks (light and dark density) are being used to print the information in the C data channel (and likewise for the M data channel). In this case, the volume produced by the C channel is computed using a 1D look-up table that stores the volume curve of FIG. 3. Similar 1D look-up tables are constructed for the M, Y, and K channels, and the total volume is computed as the sum of the volumes of the individual CMYK channels according to $$V_{total}(C,M,Y,K) = VLUT_C(C) + VLUT_M(M) + VLUT_Y(Y) + VLUT_K(K).$$

Figure 4:
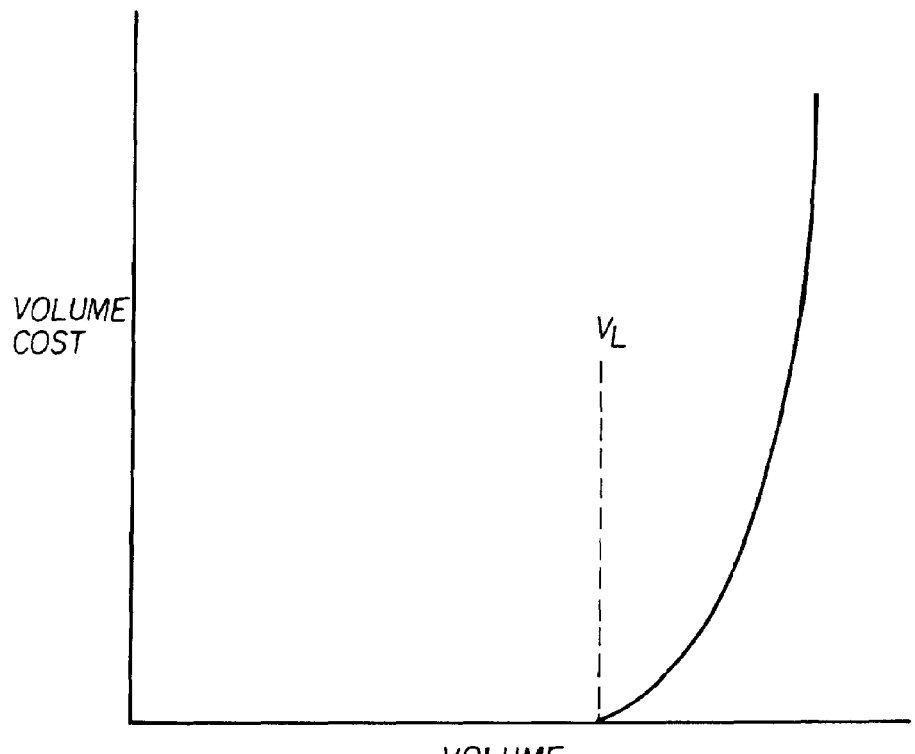
FIG. 4 is a graph showing the volume cost as a function of ink volume.

Once the total volume has been computed, a volume cost $V_{cost}(C,M,Y,K)$ is computed using a volume cost function as shown in FIG. 4. If the total volume is below a threshold or total colorant amount limit, $V_L$, then there is no cost associated with the corresponding CMYK code value combination. If the total volume exceeds the threshold $V_L$, then the volume cost increases rapidly. This will discourage the use of CMYK code value combinations that exceed the volume limit $V_L$, resulting in improved image quality. One skilled in the art will recognize that the volume cost function of FIG. 4 is just one such curve, and other curves may be used to provide similar effect.

Figure 5:
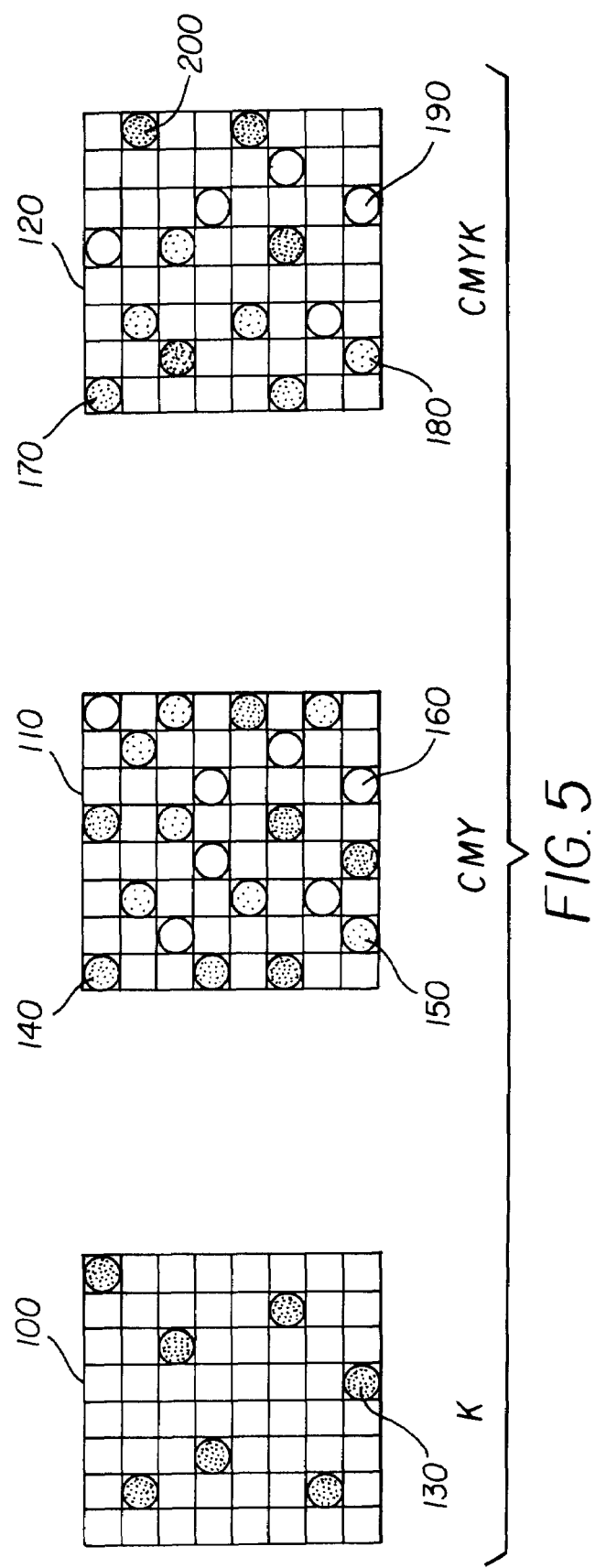
FIG. 5 is a diagram showing three halftone patterns having the same color, but generated with different amounts of K ink.

Returning to FIG. 2, in addition to a cost attribute related to the total ink volume, another important cost attribute is related to the image noise that is produced by each candidate CMYK code value combination. As mentioned earlier, many CMYK code value combinations will result in the same color, but use different total ink volume and produce different printed halftone patterns that result in different perceptions of "graininess" or "noise" when viewed by a human observer. This is graphically illustrated in FIG. 5, which shows three halftone hypothetical halftone patterns 100, 110, 120 printed using different amounts of K ink but resulting in the same output color. Halftone pattern 100 is printed using only K ink, which results in sparsely spaced K ink dots 130 that will exhibit high noise when viewed by the human eye. Halftone pattern 110 is printed using only C, M, and Y dots 140, 150, and 160, respectively. Because each K ink dot is replaced by a triplet of CMY dots to achieve the same density, the CMY dots are spaced much closer than the K dots 130, and will be perceived as less noisy. Halftone pattern 120 is printed with a mixture of C, M, Y, and K ink dots 170, 180, 190, and 200, respectively, and represents the same color reproduced with an intermediate level of noise. According to the present invention, the noise associated with each CMYK code value combination is used as a cost attribute to aid in the selection of a preferred CMYK code value combination to reproduce the desired output color. Techniques for measuring the perception of noise in printed images are known in the art. Many similar variations exist that use a weighted sum of the image power spectrum as a measure of the noise in an image. In a preferred embodiment, the following equation is used to calculate the amount of noise in an image $$N = \log\left(\frac{1}{(n_x n_y)} \sum_u \sum_v |I(u,v) CSF(u,v)|^2\right)$$

where $(n_x, n_y)$ are the dimensions of the image region, $I(u,v)$ is the 2D Fourier transform of an image region $I(x,y)$, and $CSF(u,v)$ is the contrast sensitivity function of the human visual system, which can be computed according to the equations described in U.S. Pat. No. 5,822,451. The image region $I(x,y)$ corresponds to the halftone patterns that result from printing a given CMYK code value combination. Referring again to FIG. 2, an image noise model $N(C,M,Y,K)$ is then generated using the above equation to compute noise for a set of printed color patches substantially covering the full CMYK code value range. In fact, the same set of color patches may be used to develop the device model and noise model, although this is not necessarily the case. Once the noise model $N(C,M,Y,K)$ has been generated, an image noise cost can be computed for each of the candidate CMYK code value combinations according to $$N_{cost}(C,M,Y,K) = N(C,M,Y,K).$$

Other cost attributes may be computed as required by the specific application. For example, certain CMYK code value combinations may provide improved resistance to light fading (or "lightfastness") when compared to other CMYK code value combinations. Thus, a term may be added to the cost function to penalize CMYK code value combinations that are prone to fading, thereby discouraging their use. Another term that may optionally be used in the cost function is a cost attribute related to "waterfastness", or the resistance of a CMYK code value combination to smearing when wetted. Also, certain CMYK code value combinations may provide for accurate color matching under a wide variety of illuminants, while others may only provide an accurate color match to the desired output color under a specific illuminant. This property is called the "metameric index" of the CMYK code value combination, and more robust CMYK code value combinations may be assigned a lower cost than less robust ones. Another term that may be used in the cost function relates to the surface gloss produced by a CMYK code value combination. For example, some inkjet printers use different formulations for the K ink than are used for the CMY inks. The different formulations may have different gloss properties, causing an abrupt gloss change, or "differential gloss" when printing smooth gradations. These gloss changes are undesirable, and thus CMYK code value combinations prone to differential gloss may be penalized via a cost function term. One example of this would be to create a cost attribute in which the cost increases with the amount of black (K) ink used. One skilled in the art will recognize that there are other cost attributes that may be used, depending on the specific requirements of the application.

Figure 6:
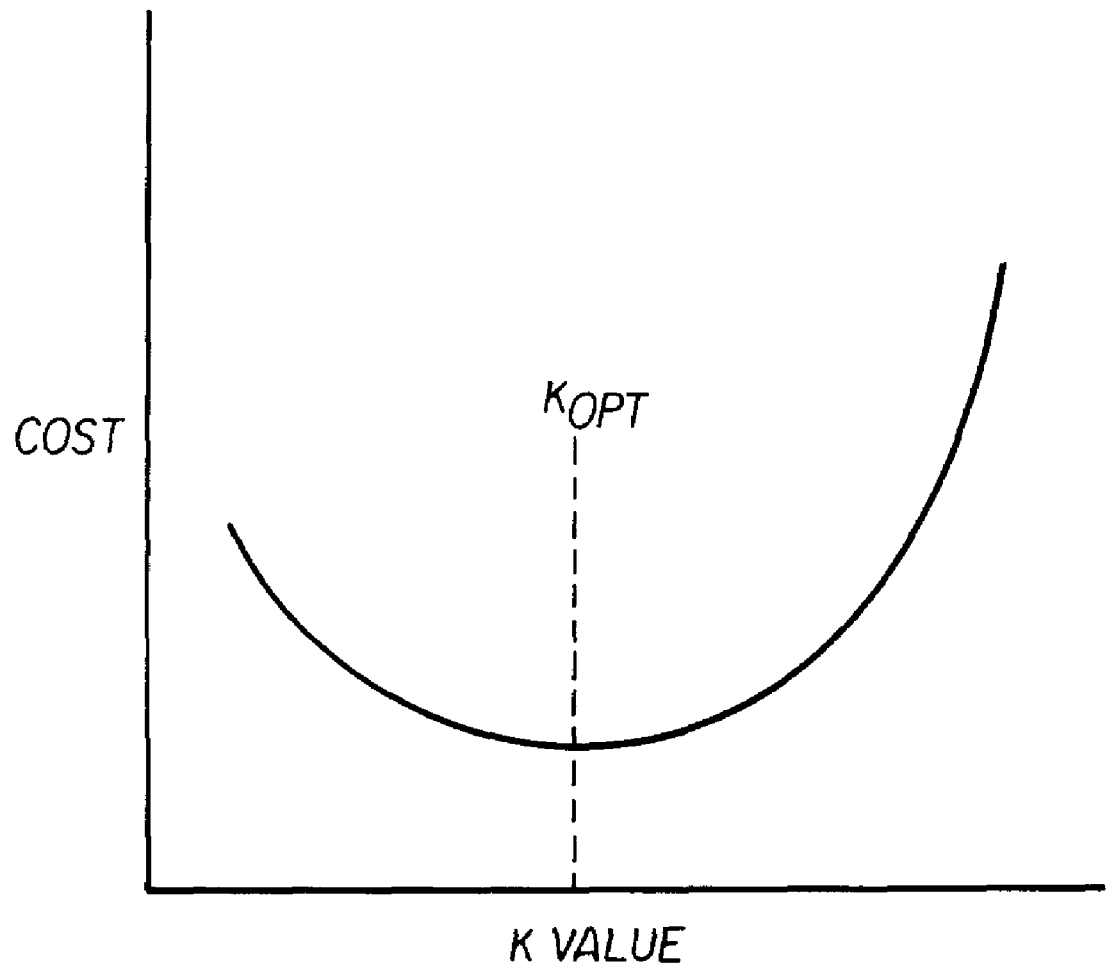
FIG. 6 is a graph showing the cost function plotted as a function of the K ink code value.

Once all of the cost attributes have been computed, the total cost for a CMYK code value combination is computed by summing up all of the terms in the cost function. In a preferred embodiment, the total cost will include at least a volume cost term and an image noise cost term according to $$\text{Cost}(C,M,Y,K) = \alpha V_{cost}(C,M,Y,K) + \beta N_{cost}(C,M,Y,K)$$

where the weights $\alpha, \beta$ may be adjusted to indicate the relative importance of volume and noise in the image. Thus, the preferred CMYK code value combination to reproduce a desired output color is chosen as the one that minimizes the cost function, as depicted in FIG. 6. A convenient way to organize the candidate CMYK code value combinations is to sort them by the K code value. FIG. 6 shows (for one desired output color) the cost of each candidate CMYK code value combination plotted against the K code value. The preferred CMYK code value combination has a K value of $K_{opt}$, which corresponds to the minimum of the cost function.

To construct a color transform suitable for incorporating into an ICC profile, the above described cost function based method of selecting a preferred CMYK code value combination to reproduce a desired output color is applied to a multidimensional lattice of desired output colors spanning the range of the CIELab DICS defined by the ICC. Typically, a lattice of L*a*b* points is defined which can then be put through the process of the present invention to determine corresponding CMYK code value combinations. Some of the desired output colors will lie outside of the color gamut of the printer, and therefore are not reproducible. These colors must be mapped to colors that are inside of the printers gamut using a gamut mapping algorithm. One simple gamut mapping technique is to move the out of gamut color along a line in CIELab space between it and a central point such as L*a*b*=(50,0,0). The intersection of the printers gamut with the line is the in-gamut color that will be used to reproduce the out-of-gamut color. There are many other gamut mapping algorithms that are known to those skilled in the art, some of which are complex and sophisticated, and the particular form of gamut mapping is not fundamental to the invention.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 10 digital image source
20 input device color transform
30 output device color transform
40 inkjet printer
100 max K halftone pattern
110 min K halftone pattern
120 intermediate K halftone pattern
130 K ink dots
140 C ink dots
150 M ink dots
160 Y ink dots
170 C ink dots
180 M ink dots
190 Y ink dots
200 K ink dots

What is claimed is:

1. A method of selecting a preferred colorant control signal vector for a color output device for reproducing a desired output color, the color output device producing output colors using four or more colorants, wherein the amount of each colorant is controlled by the colorant control signal vector, comprising the steps of:
   a) determining a device model for the color output device relating the colorant control signal vector to the corresponding output color;
   b) using the device model to determine a set of valid colorant control signal vectors whose corresponding output color substantially matches the desired output color; and
   c) selecting the preferred colorant control signal vector from the set of valid colorant control signal vectors using a cost function responsive to one or more cost attribute(s) that vary as a function of the colorant control signal vector.

2. The method of claim 1 wherein the set of valid colorant control signal vectors is limited to those satisfying a total colorant amount limit.

3. The method of claim 1 wherein one of the cost attributes is a total colorant amount.

4. The method of claim 1 wherein one of the cost attributes is an image noise metric.

5. The method of claim 4 wherein the image noise metric is determined from an image noise model that relates the colorant control signal vector to the corresponding image noise metric.

6. The method of claim 5 wherein the image noise model is formed by producing a set of color patches corresponding to a set of colorant control signal vectors and measuring the image noise metric of each color patch.

7. The method of claim 1 wherein one of the cost attributes is a function of the amount of an individual colorant.

8. The method of claim 7 wherein the cost attribute increases with the amount of a black colorant.

9. The method of claim 1 wherein one of the cost attributes is a metameric index.

10. The method of claim 1 wherein one of the cost attributes is a surface gloss value.

11. The method of claim 1 wherein one of the cost attributes is a waterfastness value.

12. The method of claim 1 wherein one of the cost attributes is a lightfastness value.

13. The method of claim 1 wherein step a) includes producing a set of color patches corresponding to a set of colorant control signal vectors and measuring the output color of each color patch.

14. A color transform having a plurality of preferred colorant control signal vectors created by applying the method of claim 1 for a plurality of desired output colors.

15. The method of claim 14 wherein the color transform is stored as a multidimensional look-up table indexed by a lattice of output colors.

16. The method of claim 14 wherein desired output colors that are not reproducible by the color output device are mapped to output colors that are reproducible by the color output device.

17. The method of claim 1 wherein the four or more colorants include cyan, magenta, yellow, and black colorants.

18. The method of claim 1 wherein at least two of the four or more colorants have similar color but different densities.

19. The method of claim 1 wherein the color output device is a color printer.

* * * * *